Aug. 30, 1966 F. E. WHITE, JR 3,269,793
HORIZONTAL FORMAT SOUND MOTION PICTURE MAGAZINE PROJECTOR
Filed Aug. 23, 1963
3 Sheets-Sheet 1

FLOYD E. WHITE, JR.
INVENTOR.

BY R. E. Beangue
ATTORNEY

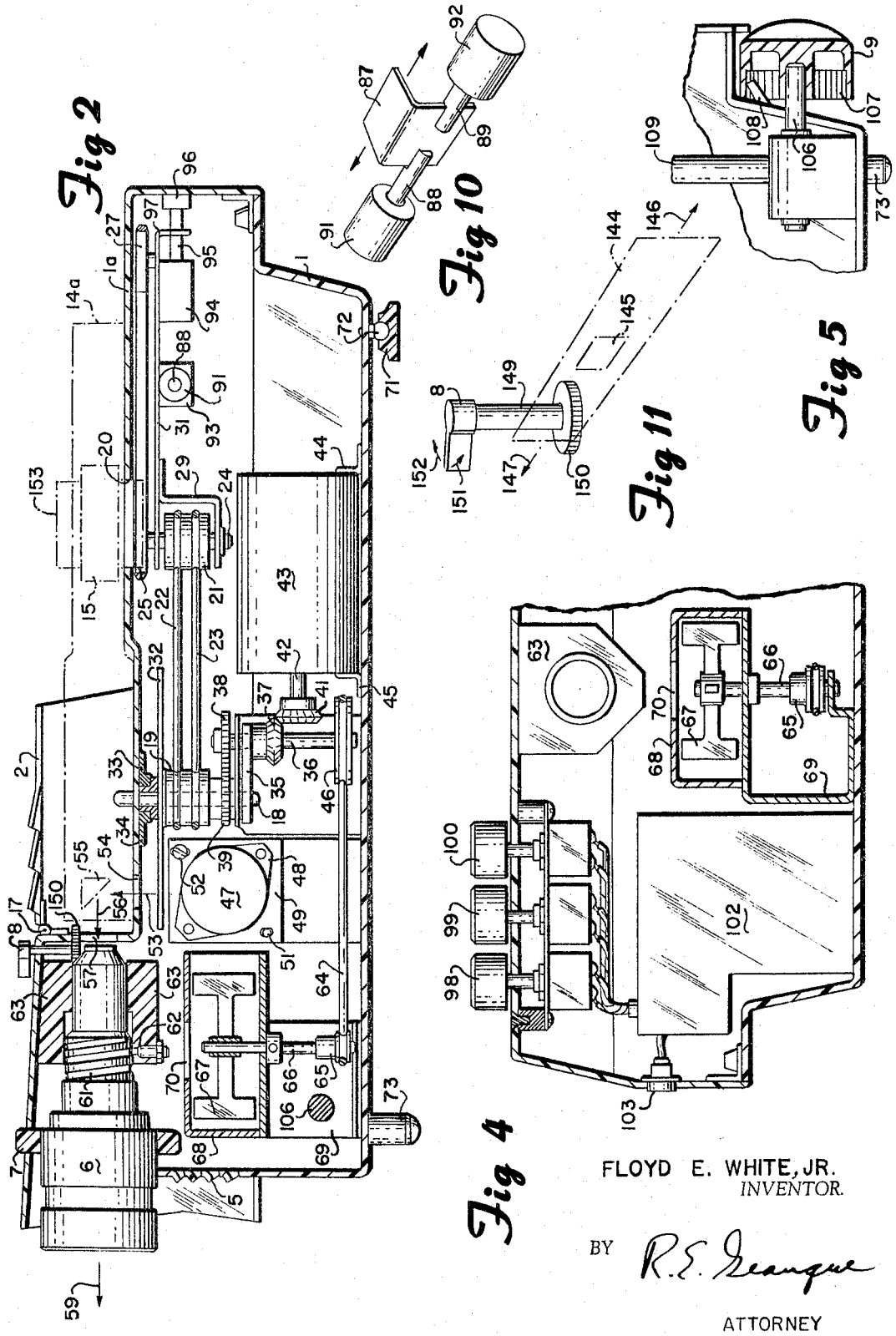

Aug. 30, 1966  F. E. WHITE, JR  3,269,793
HORIZONTAL FORMAT SOUND MOTION PICTURE MAGAZINE PROJECTOR
Filed Aug. 23, 1963  3 Sheets-Sheet 3

FLOYD E. WHITE, JR.
INVENTOR.

BY R. E. Geauque
ATTORNEY

United States Patent Office 3,269,793
Patented August 30, 1966

3,269,793
HORIZONTAL FORMAT SOUND MOTION
PICTURE MAGAZINE PROJECTOR
Floyd E. White, Jr., 526 W. Center St., Placentia, Calif.
Filed Aug. 23, 1963, Ser. No. 304,023
7 Claims. (Cl. 352—29)

This invention relates to motion picture projection apparatus and more particularly to a sound motion picture projector adapted to project both pictures and sound from film having a horizontal format and is particularly suited to accommodate film contained within a film magazine.

Various motion picture projectors have been proposed heretofore which are adapted for use with sound motion pictures contained within a film magazine which can be attached as a unit to a stationary projector without it being necessary to thread the film or make any mechanical adjustments other than insertion of the magazine. Also, it has been proposed heretofore to employ motion picture film having a horizontal format; however, each of these projectors have had certain deficiencies and drawbacks which in practice have been sufficient to seriously detract from their commercial success. In the present invention the defects of prior systems have been overcome and the advantages accruing to a sound picture film magazine and a horizontal format have been combined into a novel and improved motion picture projector which has none of the disadvantages of prior devices and which produces additional beneficial results and features.

There is disclosed in copending application Serial No. 216,669, filed August 13, 1962, entitled, "Cinematographic Process," and copending application Serial No. 304,107, filed August 23, 1963, entitled, "Sound Film Magazine," now Patent No. 3,227,066, a horizontal format film and a film magazine, respectively, which are particularly suited for operation and use in the projector of the present invention. It should be understood, however, that the apparatus of the present invention may be used with other film formats and magazines, as will become apparent in the description which follows.

The motion picture projector of the present invention comprises an extremely simple and inexpensive device requiring no film threading and which is adapted for operation with a removable film magazine enclosing and storing a complete photoplay or other film subject.

As will be apparent to those skilled in the art, the motion picture projector of the present invention is adaptable for showing various types of motion pictures including single-row horizontal format images, conventional vertical-format images, double images in side-by-side relation and stereoscopic or three-dimensional motion pictures.

In addition, synchronized sound may also be provided for each type of image projection and stereophonic sound may also be accommodated, if desired.

It is therefore the principal object of the present invention to provide a new and improved motion picture projector adapted to cooperatively receive a film magazine for the projection of images therefrom without it being necessary to thread the film or make similar mechanical adjustments other than that of properly combining the magazine and the projector.

It is another object of the present invention to provide a novel and improved motion picture projector having a removable sound film magazine which is capable of showing either horizontal format images, conventional vertical format images, superimposed images, twin image rank film to simulate three-dimensional effects, or double images in side-by-side relationship, and which may reproduce monaural of stereophonic sound tracks on the film.

Another object of the present invention is to provide a novel and improved motion picture projector which is inexpensive to produce, simple to operate, and which is capable of projecting a full-length photoplay or other film subject without the necessity of rewinding the film.

A further object of the invention is to provide a novel and improved motion picture projector which is particularly adapted to film having a horizontal format and which comprises a stationary housing containing sources of light for projection of pictures and reproduction of optical sound tracks and which is adapted to be used with a magazine containing film, arranged so the film is continuously maintained within the magazine at all times, the object being also to obviate film handling or film rewinding.

It is yet another object of the present invention to provide a novel and improved motion picture projector wherein a stationary portion of the apparatus contains the necessary light sources, drive means, and optical system for both pictures and sound, all of which when once adjusted retain their adjustments so that only the magazine containing the motion picture film to be shown need be changed by means of the simple operation of removing one magazine and replacing it with another thereby making it unnecessary for any further adjustment of any other working parts of the projector.

Many other advantages, features and additional objects of the present invention will become manifest to those versed in the art upon making reference to the detailed description and the accompanying sheets of drawings in which a preferred structural embodiment, incorporating the principles of the present invention is shown by way of illustrative example.

The invention resides partly in the mechanical, optical, and electrical structures embodied in the projector components of the system as herein specifically illustrated, but also embraces the concept of the horizontal format film magazine-projector system itself, considered as an integrated whole, and independently of the structural details of its several parts. It is to be understood, however, that inasmuch as a particular sound film magazine is not essential to the invention and does not constitute part of the instant invention, only so much of the structural details and operational features of a typical magazine, considered needed for a complete understanding of this invention, is described herein. A complete description of a suitable sound film magazine is disclosed in copending application Serial No. 304,107, filed August 23, 1963.

The present invention itself, both as to its organization and manner of operation, together with further objects and advantages thereof may best be understood by reference to the following description taken in connection with accompanying drawings, in which like references characters refer to similar parts throughout the several figures and in which:

FIGURE 2 is an elevational view, partially in section, of the apparatus of FIGURE 1;

FIGURE 4 is a fragmentary elevation view, partially in section, showing the blower and sound amplifying portions of the motion picture projector.

FIGURE 5 is a fragmentary elevation view, partially in section, illustrating details of the elevating mechanism.

FIGURE 10 is a detail view illustrating the mechanism of the film take-up shifting solenoids.

FIGURE 11 is a detail view illustrating the framing adjustment mechanism.

Figure 1:
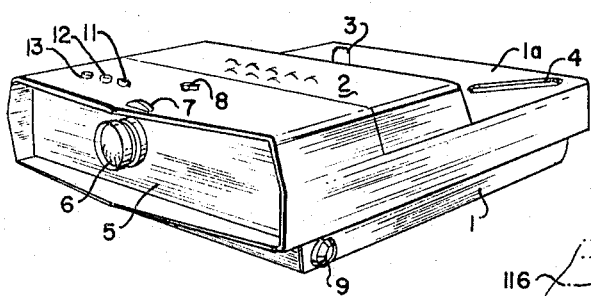
FIGURE 1 is a perspective view of a projector according to the present invention.

An exemplary embodiment of the motion picture projector of the present invention is shown in FIGURE 1 and comprises a housing 1, having a hinged cover 2 which extends rearwardly over a portion of a depressed deck portion 1a of housing 1. The deck portion 1a of housing 1 is provided with a pair of openings 3 and 4 which are adapted to receive the film drive hubs of a film magazine (not shown), as will appear hereinafter. The front of housing 1 is provided with a louvered grill 5 through which cooling air is drawn, in a manner to be described hereinafter. A projection lens 6 extends through grill 5 and is preferably centered with respect to the front side of the projector. Focusing thumb wheel 7 partially extends through the upper surface of housing 1 and permits focusing adjustments to be made in the setting of projection lens 6. Lever 8 permits framing adjustments to be made in a manner to be described hereinafter. The projector is provided with a pair of elevator control knobs at either side, one of which is shown at 9 in FIGURE 1. Other operating controls, the function of which will be described hereinafter, are shown at 11–13.

A sound film magazine, such as that shown and described in the previously mentioned copending application, is either attached to or removed from the projector by simply lifting hinged cover 2 and placing the magazine onto the rearwardly extending deck portion 1a of housing 1 so that the magazine's film drive hubs extend downwardly through receiving openings 3 and 4. The cover 2 is then returned to its closed position and the projector is ready for operation.

The manner in which the magazine is installed on the projector is shown in FIGURE 2 wherein the magazine is identified by the number 14. The magazine contains a pair of film storage cores having integrally formed drive hubs which extend outward through the magazine casing. One of the film storages cores is indicated at 15 and its lower drive hub is indicated at 16. For convenience and brevity throughout the following description, the term "spool" is used to indicate either the film storage core or the drive hub attached to the core, or both, according to the appropriate sense. As can be seen, when the magazine is installed drive hub 16 extends downwardly through opening 4 in the deck surface 1a of housing 1. Cover 2 is attached to housing 1 via hinge 17 and retains magazine 14 in place during operation of the projector.

Figure 3:
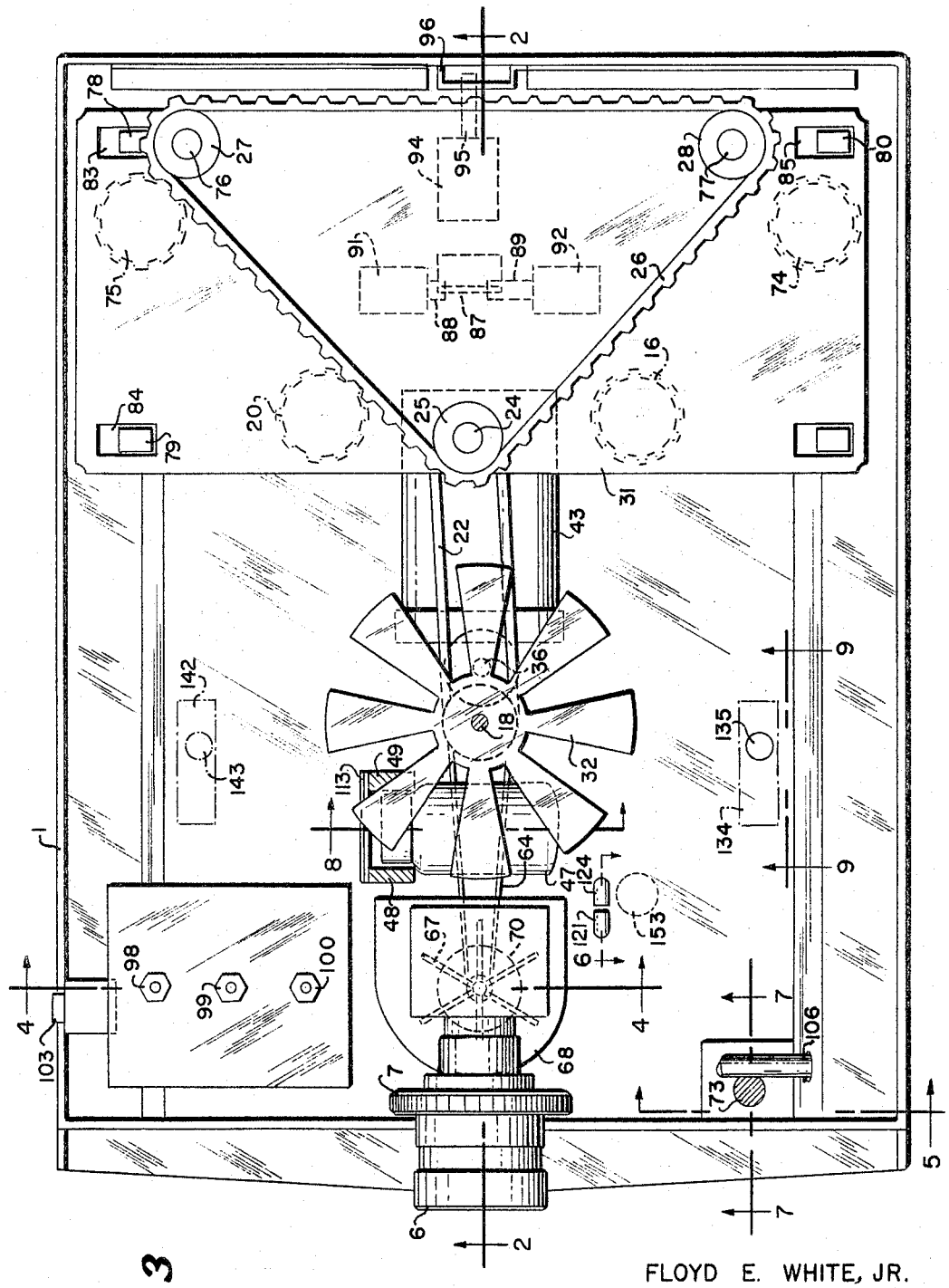
FIGURE 3 is a top plan view, partially in section, of the apparatus of FIGURE 1.

The upper end of drive shaft 18 is splined and extends upwardly from deck surface 1a so that it may engage the drive coupler of the magazine. By this means the drive mechanism within the magazine is powered. Drive shaft 18 also carries a pulley 19 which in turn drives pulley 21 via drive belts 22 and 23. Belts 22 and 23 are preferably of the coil spring type to permit a small amount of slippage, as will become apparent hereinafter. Pulley 21 is carried on shaft 24 and is adapted for rotation therewith. Shaft 24 carries drive pulley 25 which in turn applies power to timing belt 26. Timing belt 26 is also rotatably supported by pulleys 27 and 28. Shaft 24 is journaled in support bracket 29 and plate 31. The outwardly extending side of timing belt 26 is provided with integral teeth which engage one or the other of the drive hubs of the film magazine as determined by the desired direction of film transport. In FIGURE 3 timing belt 26 is shown in driving engagement with hub 20. Thus, hub 20 serves to drive the film take-up spool.

Drive shaft 18 also carries shutter 32 which is adapted for rotation therewith. Shutter 32 comprises a plurality of radial blades for cyclically interrupting the light path to the film. Shutter 32 is provided with the same number of blades as the number of faces on the splined end of shaft 18. For example, if shaft 18 carries an octagonal spline, then shutter 32 would be provided with eight blades. This arrangement assures the correct shutter phasing with the intermittent mechanism within the magazine. The upper end of shaft 18 is journaled in bearing 33 which in turn is supported by flange 34 attached to the underside of deck surface 1a.

The lower end of shaft 18 is journaled in support 35. Support member 35 also rotatably supports shaft 36 which in turn carries bevel gear 37 and pinion 38. The lower end of shaft 36 carries pulley 46. Pinion 38 drives gear 39 to impart rotary motion to shaft 18. Bevel gear 41 meshes with bevel gear 37 and is driven by motor shaft 42. Motor 43 is mounted to the floor of housing 1 via suitable mounting means such as indicated at 44 and 45. Motor 43 may be any suitable fractional horsepower motor and is preferably of the synchronous, electrically-reversible type.

The projection light source comprises lamp 47 which is carried in socket 48 mounted on adjustable plate 49. Plate 49 is supported by pin 51 and screw 52 which extend through elongated holes as shown in FIGURE 2 to permit vertical adjustments to be made in the alignment of the lamp 47 along the desired optical path. Once aligned, plate 49 is locked into place by means of screw 52. It is preferred that lamp 47 be of the type having an integral reflector which will permit the light to be directed upward in the direction indicated by arrow 53, through shutter 32, and thence through light source aperture 54 in deck 1a of the housing.

Light emerging through light source aperture 54 enters magazine 14 where it impinges on an internal reflector 55 and thence is reflected through the film along a path indicated by arrow 56. The light defining the image from the film is directed along the path indicated by arrow 56 and re-enters the projector housing via projection aperture 57. The light re-entering the projector through projection aperture 57 passes through lens 6 and is focussed onto the projection screen along the path indicated by arrow 59.

Lens 6 may be of any suitable and well-known construction and is preferably enclosed within a barrel housing having an exterior screw thread 61. The threaded portion 61 engages a spring-loaded ball 62 carried within mounting member 63. Focusing of the lens 6 may be accomplished by turning thumb wheel 7 which is attached to the lens barrel causing it to move forwardly or rearwardly under the control of the threaded portion 61.

Forced air cooling of the projection lamp 47 is provided by a belt-driven blower. Pulley 46 drives belt 64 which in turn drives pulley 65 attached to shaft 66. The upper end of shaft 66 carries multi-vaned blower wheel 67. Blower wheel 67 is located within blower housing 68, the intake opening 70 of which is located above the wheel 67, concentric with its axis, and the exhaust opening of which is directed toward lamp 47. The blower housing 68 is supported by a suitable bracket 69 attached to housing (see also FIGURE 4). Suitable exhaust openings may be provided in the sides and rear portions of the housing 1, through which the air passing over lamp 47 may exit.

Figure 7:
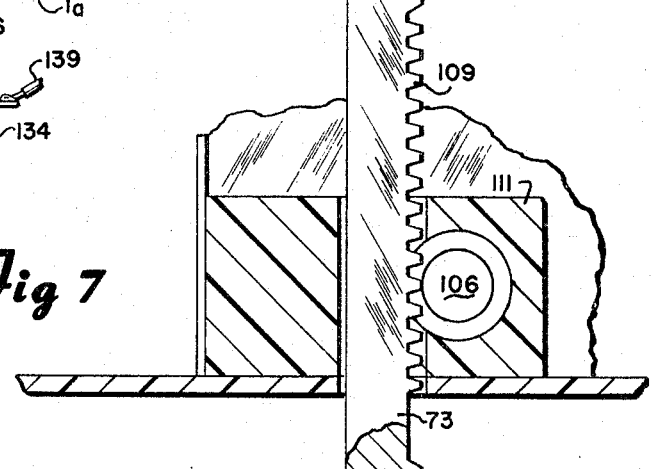
FIGURE 7 is a detail view, partially in section, illustrating the elevating mechanism.

To provide stability on inclined as well as level surfaces, the projector is supported by means of three mounting feet. A non-adjustable mounting foot is located at the midpoint of the undersurface of housing 1, adjacent the rear edge. This mounting foot comprises a resilient pad 71 having an internal recess which serves as a ball socket for ball member 72 attached to housing 1. This arrangement permits pad 71 to swivel through a small arc as required to permit leveling of the projector on an uneven surface. The forward end of housing 1 is supported by two adjustable feet, one of which is indicated at 73 in FIGURE 2. Additional structural details and the operating of the adjustable leveling feet will be described hereinafter in connection with FIGURE 7.

Referring again to FIGURE 1, it can be seen that openings 3 and 4 in deck surface 1a are elongated and extend rearwardly toward the outer corners of the housing 1. This elongated opening configuration is provided to accommodate magazines containing various lengths of film. That is, the center-to-center spacing between the film take-up and drive spools varies as determined by the length of film contained within the magazine. As will become apparent from the discussion which follows, novel means are provided to accommodate film magazines having various center-to-center spacings of the film spools without the necessity of making separate adjustments therefor.

Looking now at FIGURE 3, timing belt 26 is shown engaging the hub 20 on the cartridge for the purpose of driving the take-up spool. Assuming that the magazine is one designed to contain a relatively short film and further assuming that the film is to be transported from bottom to top, as viewed in FIGURE 3, when the projector is set to run in a forward mode, the timing belt 26 will engage hub 20 as shown. The location of the supply hub is indicated at 16.

If a film magazine designed to contain a longer film is installed on the projector, then the center-to-center spacing between the hubs would be correspondingly greater. Under these latter conditions the location of the film take-up hub would be displaced outwardly and rearwardly as indicated at 75. The location of the corresponding supply hub is indicated at 74.

As can be seen, the film supply hub 16 (or hub 74) is not engaged with timing belt 26 in the forward mode. However, if the direction of film travel is reversed, so that the film moves from top to bottom—as viewed in FIGURE 3—then an automatic adjustment is made whereby the timing belt 26 will disengage from hub 20 (or hub 75 and will engage hub 16 (or hub 74). This adjustment will then interchange the functions of the supply and take-up spools within the cartridge. The automatic adjustment will now be described.

Plate 31 is slidably mounted on guides which will permit it to be laterally shifted. Plate 31 is shown in its upper position in FIGURE 3. Support members 78–79 and 80–81 extend upwardly through corresponding rectangular openings 83–86 in plate 31. This will permit plate 31 to be transversely displaced through a small distance within the limits of openings 83–86. Bracket 87 is attached to the undersurface of plate 31 and has its lower terminus connected to armatures 88 and 89 of solenoids 91 and 92, respectively (see FIGURE 10). Solenoids 91 and 92 are fixedly mounted to housing 1 via support bracket 93 (see FIGURE 2). Armatures 88 and 89 are spring-biased so that they will return to an extended position whenever solenoids 91 and/or 92 are de-energized. Solenoid 94 is mounted to the undersurface of plate 31 and its armature 95 projects through a guide hole 97 in a downwardly extending portion of the rearward edge of plate 31, as shown in FIGURE 2. This solenoid (94) is of the type which extends its armature (95) upon energization. Armature 95 is spring-biased so that it will return to a retracted position whenever solenoid 94 is not energized. The rearward wall of housing 1 is provided with a detent catch 96 which is provided with two recesses into which armature 95 may move whenever plate 31 is in either of two transversely spaced positions. Plate 31 is urged to a centered position, by spring-biased armatures 88 and 89, whenever power to solenoids 91 and 92 is cut off.

Solenoid 94 is electrically interconnected with solenoids 91 and 92 so that solenoid 94 will be continuously energized and extended whenever either solenoid 91 or 92 is momentarily energized. Preferably, power to solenoid 94 is interlocked with the power supply to drive motor 43 so that it will be continuously energized while the film is being transported. However, solenoids 91 and 92 need only be momentarily energized to establish the desired direction of film transport. If it is desired to transport the film from right to left then solenoid 91 is momentarily energized which will pull in armature 88 and shift plate 31 to the left. Concurrently, solenoid 94 will be energized, thus extending armature 95. This action will lock the detent catch mechanism at the left-hand position by extending armature 95 into the recess in catch 96. When the drive motor is turned off, solenoid 94 will also be de-energized, thus permitting the spring-biased armature 95 to revert to its retracted position, thus permitting plate 31 to move to its centered position. By this means, the magazine hub drive system will be disengaged whenever the power is off and/or the drive motor is not running.

If it is desired to transport the film from left to right, then the operation is reversed. That is, solenoid 92 is momentairily energized, thus retracting armature 89 and causing plate 31 to move downward as viewed in FIGURE 3. At the same time, solenoid 94 will be energized and extend armature 95 to lock the detent mechanism at the right-hand position. In this condition, the timing belt 26 will engage the right-hand spool 16 (or 74). In order to accommodate the continuously changing quantity of film which winds up onto the take-up spool, even though the drive motor 43 continues at a constant speed, deliberate slippage is permitted between belts 22–23 and pulleys 19 and 21. Thus, the torque applied to timing belt drive pulley 21 is sufficient to drive the take-up spool, yet not enough to break the film.

Suitable operating controls may be provided as shown in FIGURE 4. Function selector switch 98 may be used to run the motor 43 in either the forward or reverse direction and to turn on the projection lamp 47. Also, this control may be used to momentairly energize solenoids 91 or 92 when reversing the direction of film transport. Suitable electrical control circuits are considered well known and not included herein for clarity and brevity.

Sound reproduction may be adjusted by volume control 99 and tone control 100. An audio amplifier of any suitable and well-known construction may be used to amplify the sound track signal. The location of the amplifier within the projector is indicated generally at 102. Although not shown, it is preferred that the projector be provided with a carrying case adapted to enclose the projector, and that a loudspeaker and its interconnecting cable be provided within the carrying case. Connection to the external loudspeaker may be made via jack 103 which in turn is wired into amplifier 102. Circuit details of controls 98–100 and amplifier 102 are omitted since circuits of this type are well known and it is believed that the description of the invention is sufficient for those skilled in the art to practice it. Details of the sound pickup will be described hereinafter in connection with FIGURE 6.

There is shown in FIGURE 5 details of the elevator mechanism for controlling the two adjustable feet which support the front end of the projector. Inasmuch as the two adjustable feet (right- and left-hand sides) are substantially identical, only the right-front elevator assembly will be described. Elevator knob 9 is mounted on shaft 106 and adapted for rotation therewith. Knob 9 is provided with an inwardly extending skirt, the interior surface of which is provided with a plurality of serrations 107. These serrations (107) engage detent spring 108 in order to frictionally lock the setting of the knob 9. Shaft 106 is journaled within, and extends through, block 111. A splined portion of shaft 106 engages gear-rack teeth 109 on foot member 73 (see also FIGURE 7). Foot member 73 is supported within a transverse opening in block 111, which in turn is mounted to the floor of housing 1. The lower end of foot member 73 is provided with a resilient pad 112 to prevent marring of any surface on which it may be placed.

As can be seen, rotation of shaft 106 will cause foot member 73 to move up or down as is required to adjust the elevation of the projector. Inasmuch as the right- and left-hand feet of the projector are independently adjustable, and since the third support point on the projector (pad 71) is located at the rear midpoint of the housing, the projector can be tilted from side to side as well as raised or lowered in elevation. This arrangement permits adjustments to be made over a convenient range in order to properly align the image on the projection screen.

Figure 8:
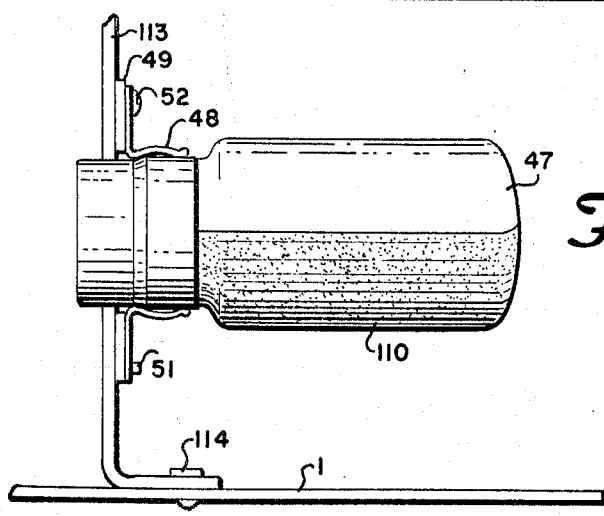
FIGURE 8 is a fragmentary view illustrating the projection lamp assembly.

Additional details of the projection lamp mounting arrangement are shown in FIGURE 8. As can be seen, the projection lamp 47 is carried by socket 48 which in turn is mounted on adjustable plate 49. Plate 49 is supported on bracket 113 which is mounted to the floor of housing 1 by suitable fasteners, one of which is indicated at 114. The lamp is preferably of the type having an internal reflector and may be partially coated, as indicated at 110, to block extraneous light. Other types of projection lamps and appropriate light collimating optics may be employed, if desired, as will be apparent to those versed in the art.

Figure 6:
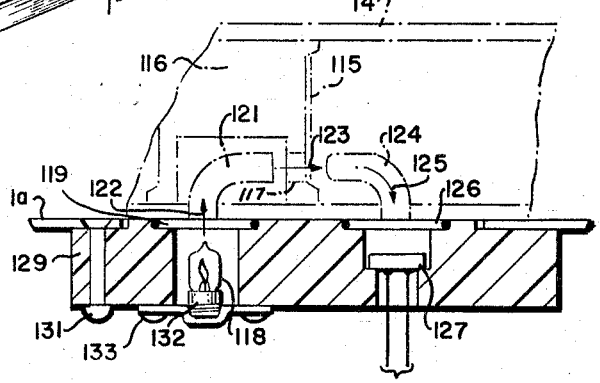
FIGURE 6 is a somewhat diagrammatic sectional view showing the exciter lamp and photocell, and the relationship of the projector's sound pickup elements to the film magazine.

The projector of the present invention may be adapted for use with films having either optical or magnetic sound tracks, or a combination of both. There is shown in FIGURE 6 a preferred embodiment of an optical sound pickup assembly suitable for use in the projector of the present invention. The film 115 contained within magazine 14 passes over a non-rotating sound drum 116 having a sound aperture 117 therein. The optical sound track on the firm 115 is scanned as it passes over the sound aperture 117. Light from exciter lamp 118 in the projector is radiated upward through transparent window 119. Window 119 may be made from plastic or glass and has its upper surface mounted flush with the surface of deck 1a. Light passing through window 119 is conducted through a plastic light pipe 121, located within sound drum 116, to the sound aperture 117 along the path indicated by arrows 122 and 123. Light passing through the sound aperture 117 and the sound track 115 is conducted via light pipe 124 downwardly in the direction of arrow 125 to window 126. The construction of window 126 may be the same as that of window 119. The light passing through window 126 impinges on photoelectric cell 127. Variations in the illumination falling on photoelectric cell 127, as determined by the sound track on film 115, is effective to generate a sound signal which is communicated to the audio amplifier 102 via leads 128.

The sound pickup assembly is preferably mounted on a supporting member 129, fabricated from plastic or other insulating material, and which is attached to deck surface 1a via suitable fastening means of the type indicated at 131. Exciter lamp 118 may be carried by socket 132, which in turn is fastened to member 129 by suitable fastening means indicated generally at 133. Light pipes 121 and 124 are preferably fabricated from solid plastic rods having a highly polished surface. Additional details of the sound pickup assembly shown in FIGURE 6 may be obtained by making reference to the above mentioned copending application Serial No. 304,107.

While other suitable sound pickup mechanisms may be employed, these being well known to those versed in the art, the optical sound pickup shown and described in connection with FIGURE 6, is preferred since it obviates electrical interconnection between magazine 14 and the projector and further obviates critical alignment or registration between the sound drum in the magazine and the sound transducer in the projector.

To accommodate magnetic sound tracks, a magnetic pickup head may be located on the exterior surface of deck 1a and adapted to enter a receiving aperture in the magazine when the magazine is installed. The location of such an aperture is shown at 153 in FIGURE 3. Once the magazine is installed, the magnetic pickup head will be in registration with the sound track as it passes over the sound drum within the magazine. Inasmuch as optical and magnetic sound tracks are usually displaced by differing distances from their corresponding image frame (usually 26 frames for 16-mm. optical sound and 28 frames for 16-mm. magnetic sound) this spatial separation will allow both magnetic and optical sound pickup heads to be installed on the same projector. The exact construction of such modification is not included herein since film standards vary widely and adapting the invention to a selected standard would be readily accomplished by one skilled in the art.

It should be understood that dual sound pickup heads of either the optical or magnetic type may be utilized in the event that it is desired to reproduce stereophonic sound.

Figure 9:
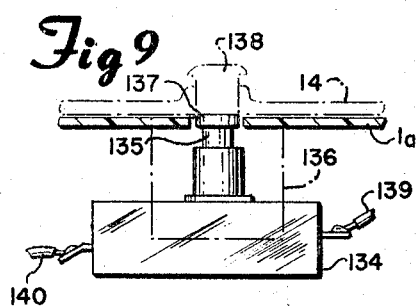
FIGURE 9 is a detail view illustrating the automatic-stop switch.

There is shown in FIGURE 9 an automatic stop switch which coacts with the film in the magazine to shut off the motor 43 whenever the end of the film is reached. The film is adapted to have a notched or cutout portion immediately following the last image at either end of the film. Switch 134 of the "snap-action" type is provided with a plunger 135 which is normally spring-biased upward. Switch 134 is attached to the undersurface of deck 1a of housing 1 by means of bracket 136. An aperture is provided in deck surface 1a through which plunger 135 may extend. Magazine 14 is provided with an actuator button 138 which abuts against switch plunger 135 when the magazine is installed, causing plunger 135 to be depressed downwardly at all times except when the end of the film is reached or when a break in the film occurs. When the notched portion on the ends of the film pass over button 138, the upward motion of plunger 135 will cause the circuit between terminals 139 and 140 to be opened, thus stopping motor 43. A similar function will occur in the event of film breakage. Obviously, if cover 2 is raised and the magazine is removed from the projector, switch plunger 135 will be allowed to move upward causing the motor 43 to stop. This arrangement permits the motor to be energized only when the magazine is in place and the end of the film has not been reached. The electrical wiring between the switch 134 and the motor 43 is considered well known and not included herein for clarity and brevity.

The framing adjustment mechanism is shown in FIGURE 11. Aperture mask 144 is carried on the front wall of the magazine 14 and is provided with a framing aperture 145 through which the image is projected. Aperture mask 144 is mounted on the magazine by suitable means which will permit it to be moved laterally in either direction along the path of film transport, as indicated by arrows 146 and 147. Framing adjustment lever 8 is attached to shaft 149 and turns therewith. The lower end of shaft 149 is provided with a drive wheel 150 which frictionally engages aperture mask 144 whereby rotation of framing knob 8 through a small arc, as indicated by arrows 151 and 152, will cause aperture mask 144 to be translated to the right or left as is required to properly frame the image on the screen.

After one rank of film images have been shown the projector is automatically stopped. The magazine is then removed, inverted and replaced onto the projector for the showing of the second rank of film images. The direction of film transport remains the same. When re-installing the magazine, it is placed onto deck surface 1a so that hub 153 (as seen in FIGURE 2) projects downwardly into receiving opening 4 (as seen in FIGURE 1). Upon closing cover 2 the magazine will be ready for projection of the second rank of images on the film. It is necessary only that the magazine be inverted so that the rank of images which has already been projected is on top, with the second rank of images on the bottom. Alternatively, a new magazine can be installed and cover 2 lowered to the operating position. The picture projecting aperture in the cartridge will, in either instance, face the front of the projector. The film may then be projected and will automatically stop when the end of the film (viz the notch) is reached and the automatic shutoff switch 134 is actuated. Projection of the second rank of images effectively rewinds the first rank of images so that the film may be again projected without the necessity of a separate rewinding process.

While the foregoing description has been directed principally to a motion picture projection system comprising a magazine containing dual-rank film having adjacent horizontal rows of images, with one row of images being inverted with respect to the other row, it should be understood that the projector is not necessarily limited to this film format. On the contrary, the magazine may contain conventional vertically-oriented image frames which may be projected by the apparatus of the present projector with but minor modification. By merely placing a suitable image rotating device in front of the existing projection lens, vertical format films may be projected without physically re-positioning the projector. If only single-rank image films (whether vertical or horizontal) are to be shown, or if stereoscopic images are to be projected, then suitable optical adjustment means may be provided for directing the image through aperture 57 and lens 6 onto the projection screen. It is preferred that two switch assemblies of the type shown in FIGURE 9 be provided to accommodate reverse motion of the film. The alternate switch may be located at the left of the projector at 142–143 as shown in FIGURE 3.

As can be seen from the foregoing description, the projector of the present invention requires no film threading or rewinding: Either single or double-rank images may be shown with synchronized sound reproduction. Moreover, the projector of the present invention is economical to produce and requires a minimum number of bearings, sprockets and similar expensive parts.

While there have been shown and described and pointed out the fundamental novel features of the invention as applied to a preferred embodiment, it will be understood that the various omissions and substitutions and changes in the form and details of the projector illustrated and its operation may be made by those skilled in the art, without departing from the spirit of the invention; therefore, it is intended that the invention be limited only as indicated by the scope of the following claims.

What is claimed is:

1. A motion picture projector for use with an interchangeable self-contained film magazine of the type having an intermittent film advancement mechanism and a positive-drive film take-up spool contained therein, comprising:

a stationary housing having an aperture in a wall thereof;
   continuously rotating drive means contained within said housing;
   rotary motion transmission means contained within said housing having an input drivingly connected to said continuously rotating drive means and an output, and having a degree of permissible slippage between said input and output;
   intermittent light source means located within said housing adjacent said aperture for cyclically illuminating a portion of the film within said magazine;
   a projection lens carried by said housing and adapted to focus the image of said cyclically illuminated portion of said film onto a screen;
   a first releasable drive connection between said drive means and said intermittent mechanism within said magazine for imparting a positive continuous rotary motion to said intermittent mechanism; and a second releasable drive connection between the output of said transmission means and the spool within said magazine, and adapted to impart a positive rotary drive to said spool.

2. A motion picture projector as defined in claim 1 wherein the film within said film magazine comprises sound motion picture film of the type having an optically recorded sound track, and including:
   exciter lamp means carried by said housing and adapted to illuminate the sound track of the film within said magazine; and
   photoelectric cell means carried by said housing and responsive to light transmitted through said sound track.

3. The combination of a motion picture projector and a removable film magazine containing a length of film to be projected, comprising:
   a stationary housing having a projection aperture therein;
   a light source mounted within said housing;
   a shutter contained within said housing for intermittently interrupting the light from said light source;
   a projection lens carried by said housing alignment with said projection aperture;
   a deck surface on said housing for engaging and supporting said film magazine;
   reflector means supported by and carried within said magazine for directing said interrupted light through the film in said magazine and thence through said projection aperture;
   a releasable connection between said magazine and said housing, through which rotary motion may be transmitted;
   continuous drive means located within said housing for imparting rotary motion to said shutter and to said releasable connection; and
   intermittent means contained within said magazine for converting continuous rotary motion transmitted through said releasable connection to a cyclical translational motion and thereby intermittently transport said film past said projection aperture.

4. The combination as defined in claim 3 wherein said shutter has eight opaque sectors and eight open sectors and said releasable connection comprises an octagonal splined shaft rotatably supported by said housing and an octagonal spline-receiving socket rotatably supported by said magazine.

5. The combination as defined in claim 3 wherein said magazine is provided with
   a pair of rotatable film storage cores for supporting said length of film.

6. The combination of a motion picture projector and a removable film magazine enclosing and carrying a length of film to be shown in the projector comprising:
   a housing having first and second spaced apart apertures therein through which light may emerge from within said housing and re-enter into said housing;
   a light source adjacent said first aperture, within said housing;
   a shutter interposed between said light source and said first aperture whereby the light emerging from said first aperture may be cyclically interrupted;
   a projection lens having its optical path in alignment with the path of light re-entering through said second aperture;
   a portable film magazine being removably supported by said housing and having a pair of windows coextensive with said first and second light apertures, respectively;
   a motion picture film enclosed within and carried by said magazine, and adapted to be moved within said magazine in a path between said apertures;
   a reflector within said magazine for diverting light from said first aperture through said film and thence through said second aperture; and drive means for operating said shutter within said projector and for moving said film within said magazine.

7. A motion picture projector having the film thereof supported on a pair of film storage hubs contained in a magazine, comprising:
- a housing having a horizontal upper deck surface for receiving and supporting said magazine;
- rotary drive means contained within said housing;
- light source means contained within said housing for directing light upwardly into said magazine to illuminate at least a portion of the film therein;
- a rotary shutter coupled to said drive means and interposed between said light source means and said magazine;
- optical means carried by said housing for projecting an image from said illuminated portion of said film;
- an upwardly extending drive shaft for imparting continuous rotary motion in a horizontal plane to wind and unwind said film within said magazine;
- laterally displaceable plate means contained within said housing;
- actuator means connected to said plate means for selectively shifting said plate means between one or the other of two operating positions; and
- timing belt means rotatably supported on said plate means and driven by said rotary drive means, and adapted to drivingly engage one of said storage hubs in one of said operating positions and to drivingly engage the other of said storage hubs in the other of said operating positions.

References Cited by the Examiner

UNITED STATES PATENTS

| | | | |
|---|---|---|---|
| 1,760,219 | 5/1930 | Thornton | 352—189 |
| 1,760,220 | 5/1930 | Thornton. | |
| 2,015,344 | 9/1935 | Kosken | 352—28 |
| 2,624,232 | 1/1953 | Kingston | 352—83 |
| 2,676,023 | 4/1954 | Isom | 352—29 X |
| 3,176,310 | 3/1965 | Finnerty | 352—29 |

NORTON ANSHER, *Primary Examiner.*

WILLIAM MISIEK, *Examiner.*